United States Patent [19]

Teraoka et al.

[11] Patent Number: 4,601,217
[45] Date of Patent: Jul. 22, 1986

[54] POWER DIVIDING DIFFERENTIAL

[75] Inventors: Masao Teraoka, Sano; Toshio Kobayashi, Ota, both of Japan

[73] Assignees: Tochigifuji Kabushiki Kaisha; Fuji Heavy Industries, Ltd., both of Tokyo, Japan

[21] Appl. No.: 687,823

[22] Filed: Dec. 31, 1984

[30] Foreign Application Priority Data

Jan. 26, 1984 [JP] Japan .................. 59-10951

[51] Int. Cl.<sup>4</sup> ............... F16H 37/08; F16H 37/06
[52] U.S. Cl. ............................... 74/701; 74/705; 180/250
[58] Field of Search ........ 74/665 GC, 665 GB, 710.5, 74/700, 701, 705; 180/248, 249, 250

[56] References Cited

U.S. PATENT DOCUMENTS

| 2,203,282 | 6/1940 | Keese ................ | 180/250 X |
| 2,228,581 | 1/1941 | Olen ................. | 180/250 X |
| 4,318,305 | 3/1982 | Wetrich et al. ...... | 74/701 X |
| 4,520,690 | 6/1985 | Dangel .............. | 74/705 X |

FOREIGN PATENT DOCUMENTS

| 714357 | 7/1965 | Canada .............. | 74/701 |
| 2527291 | 11/1983 | France .............. | 74/701 |
| 169746 | 12/1959 | Sweden .............. | 74/701 |
| 173691 | 12/1960 | Sweden .............. | 74/701 |

Primary Examiner—Kenneth J. Dorner
Assistant Examiner—D. Wright
Attorney, Agent, or Firm—Maurice E. Gauthier

[57] ABSTRACT

A power dividing differential has a hollow shaft subdivided into an input side section and an output side section. The input side section is connection to a drive, and the output side section is drivingly connected to a differential pinion meshing with a pair of side gears. One side gear drives a front wheel drive shaft extending axially through the hollow shaft, and the other side gear is drivingly connected to a differential housing which in turn is drivingly connected to a rear wheel drive shaft. A sleeve is slidable on the hollow shaft between a first position spaced from the differential housing and a second position engaged with the differential housing, thereby locking the differential.

3 Claims, 2 Drawing Figures

POWER DIVIDING DIFFERENTIAL

TECHNICAL FIELD OF THE INVENTION

This invention relates to a power divider which distributes the motive power from a drive device to the front and rear wheels of a four-wheel drive vehicle etc, more specifically a subassembly for the power driver which makes the whole length of the power divider shorter with easy assembling.

BACKGROUND OF THE INVENTION

An example of previously existing devices which performs the function as the power divider is described on page 72 of *Four wheel Drive Vehicles* (in Japanese, written by Goro Suzuki, published by Sankaido, Dec. 15, 1982), wherein a hollow shaft for receiving power from the drive device such as an engine is coupled at its output side to a differential device within a transfer case, to which a front wheel drive shaft and an intermediate shaft for a rear wheel drive shaft are also connected. Thus, the input power which the hollow shaft receives from the engine is transformed into rotation, on one hand, of the front wheel drive shaft, and on the other hand, of the rear wheel drive shaft. This rotation is then transmitted to the front wheels and the rear wheels.

When a difference in rotation rates between the front wheel drive shaft and the rear wheel drive shaft arises, the differential device acts to maintain smooth power transmission, whereas when a differential lock becomes necessary, the intermediate shaft is locked by the differential device. This is achieved by a sleeve and spline mechanism. In this structure, since the rear wheel drive shaft is located above the intermediate shaft coaxial with the hollow shaft, the height above ground of the rear wheel drive shaft extending far to the rear of the vehicle can be maintained, which is a particularly great advantage in off-the-road driving.

However, in such a conventional power divider, it is necessary to have the intermediate shaft provided on the rear side of the hollow shaft, which makes the length of the transfer case along the front-rear direction of the vehicle long. This means that in order to accommodate the power divider, the degree of freedom in designing other parts is severely restricted, and also the weight of the vehicle is increased. In addition, the total number of parts is increased by the addition of the intermediate shaft and the bearing for supporting it in the transfer case, and this in turn complicates the work of assembly and supervision of parts.

In contrast to this type of power divider, there are others in which there is no rear wheel drive shaft, but, rather, the intermediate shaft itself is used as the rear wheel drive shaft, which reduces the length of the transmission system along the front-rear direction of the vehicle, and the number of parts is reduced. However, the height above ground of the rear wheel drive shaft extending far to the rear of the vehicle cannot be maintained enough, which raises the problem of impaired performance in off-the-road travel, which is one of the main purposes of a four-wheel drive vehicle.

SUMMARY OF THE INVENTION

A major object of the present invention is to provide a power divider which permits easy subassembly at the time of assembling.

Another object of this invention is to provide a power divider having an improved differential locking device, in which the height above ground of the rear wheel drive shaft can be maintained enough.

Another object of this invention is to provide a power divider which is compact, light weight, easily assembled, and easy for parts supervision.

To accomplish this purpose, a power divider according to the present invention comprises: a hollow shaft which receives power from a drive device; a pinion shaft provided on the output side of the hollow shaft; a pinion gear which is rotatably supported by the pinion shaft; a pair of side gears which are meshed to the pinion gear; a front wheel drive shaft which passes through the hollow shaft along its axis and is integrally operatively coupled to one of the side gears; a differential case which is integrally connected with the other of the side gears, and which encloses the pinion shaft, pinion gear and side gears, and from which power can be taken; and in addition, a sleeve provided to seperate the output side of the hollow shaft from the input side thereof, and an engagement section for differential locking provided between the sleeve and the differential case, so that the sleeve and the differential case can be engaged and disengaged by motion of the sleeve.

BRIEF DESCRIPTION OF THE DRAWINGS

These and other aspects and advantages of the invention will become apparent by reference to the following detailed description of a preferred embodiment when considered in conjunction with the accompanying drawings.

DETAILED DESCRIPTION OF EMBODIMENTS

Figure 1:
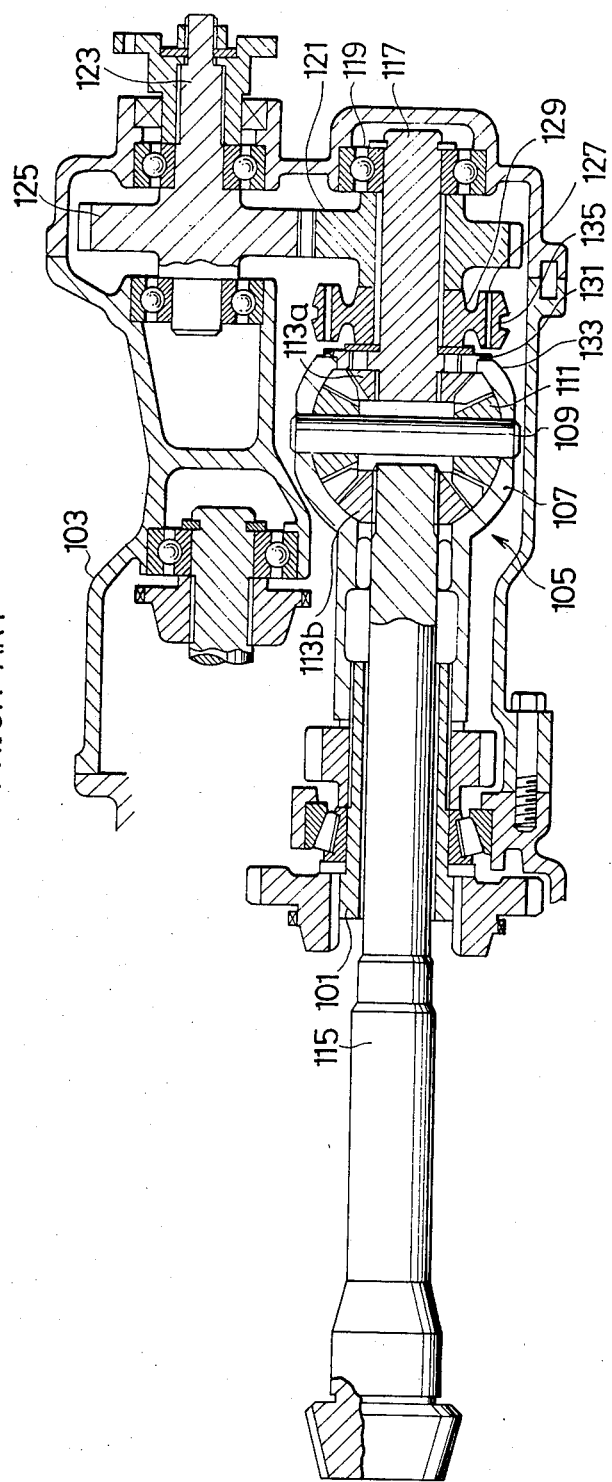
FIG. 1 is a longitudinal sectional view of one example of a conventional power divider with some parts omitted.

Referring to FIG. 1, which is similar to the drawing as shown on page 72 of *Four wheel Drive Vehicles* (in Japanese, written by Goro Suzuki, published by Sankaido, Dec. 15, 1982), a hollow shaft 101 is rotatably supported inside of a transfer case 103 of a vehicle and receives power from the drive device such as an engine of the vehicle, which is not shown in this figure. The output side of the hollow shaft 101 is integrally coupled to a differential case 107 of a differential device 105. A pinion shaft 109 is fixed to the differential case 107, and has a pinion gear 111 rotatably supported within the differential case 107. A pair of side gears 113*a* and 113*b* are meshed to the pinion gear 111 on the opposite sides thereof in the axial direction of the hollow shaft 101. One of the side gears 113*b* is coupled to one end of a front wheel drive shaft 115. The front wheel drive shaft 115 passes through the hollow shaft 101 along its axis and extends to the front wheel side of the vehicle, which is not shown.

The other side gear 113*a* is coupled to one end of an intermediate shaft 117 which is coaxial with the hollow shaft 101. The other end of the intermediate shaft 117 is supported by a transfer case 103 through a bearing 119. An intermediate gear 121 is fixed to the intermediate shaft 117 and in turn is meshed to an input gear 125 of a rear wheel drive shaft 123. Located above the intermediate shaft 117 is a rear wheel drive shaft 123 which is rotatably supported by the transfer case 103. The rear wheel drive shaft 123 further extends to the rear wheel side of the vehicle, which is not shown.

Meanwhile, a first lock member 129, of which the outer circumference has splines 127, is fixed to the intermediate shaft 117; and a second lock member 133, which has splines 131 of the same diameter as the splines 127, is fixed to the differential case 107. A sleeve 135 is meshed with the splines 127 and can be slid so that it can mesh with the splines 127 and the splines 131 simultaneously.

Thus, the input power which the hollow shaft 101 receives from the engine is transformed into rotation, on one hand, of the front wheel drive shaft 115, which is driven through the differential case 107, the pinion shaft 109, the pinion gear 111 and one of the side gears 113b, and on the other hand, of the rear wheel drive shaft 123, which is driven through the other side gear 113a, the intermediate shaft 117, the intermediate gear 121 and the input gear 125. This rotation is then transmitted to the front wheels and the rear wheels of the vehicle, which are not shown.

When a difference in rotation rates between the front wheel drive shaft 115 and the rear wheel drive shaft 123 arises, the differential device 105 acts to maintain smooth power transmission. When a differential lock becomes necessary, the sleeve 135 can be slid by operating a differential lock lever at the driver's seat, which is not shown; wherein the sleeve 135 simultaneously meshes with both the splines 127 and the splines 131, so that the first lock member 129 and the second lock member 133 become integrally coupled for differential locking. In this structure, since the rear wheel drive shaft 123 is located above the intermediate shaft 117 which in turn is coaxial with the hollow shaft 101, it is easy to maintain the height above ground of the rear wheel drive shaft 123 which extends far to the rear of the vehicle, which is a particularly great advantage in off-road driving.

However, in such a conventional power divider, it is necessary to have the intermediate shaft 117 with the intermediate gear 121, which makes the length of the transfer case 103 along the front-rear direction of the vehicle very long. This means that in order to accommodate the power divider, the degree of freedom in designing other parts is severely restricted, and also the weight of the vehicle is increased. In addition, the total number of parts is increased by the addition of the intermediate shaft 117 and the bearing 119 which supports it on the transfer case 103, and this in turn complicates the work of assembly and supervision of parts.

In contrast to this type of power divider, there are others in which the rear wheel drive shaft 123 is not located above the intermediate shaft 117, but, rather, the intermediate shaft 117 itself is used as the rear wheel drive shaft. In this case the intermediate gear 121 becomes unnecessary, which reduces the length of the transmission system along the front-rear direction of the vehicle, and the number of parts is reduced. However, the height above ground of the rear wheel drive shaft, which extends far to the rear of the vehicle, cannot be maintained, which raises the problem of impaired performance in off-road travel, which is one of the main purposes of a four-wheel drive vehicle.

Figure 2:
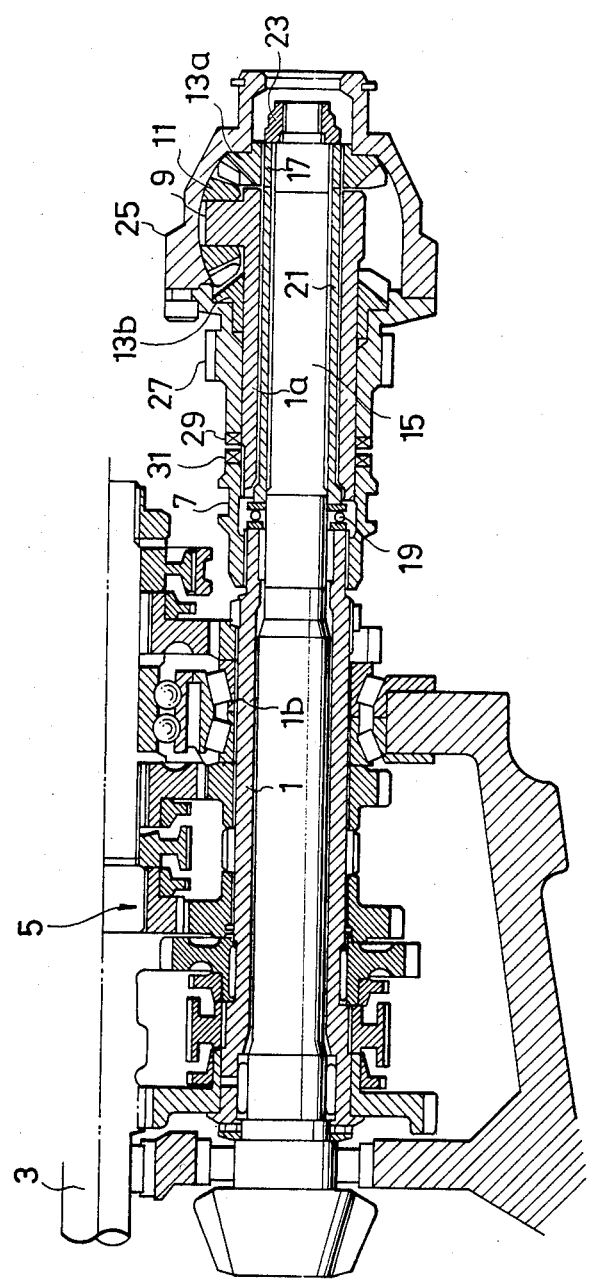
FIG. 2 is a longitudinal sectional view of a power divider according to one embodiment of the present invention, again with some parts omitted.

One embodiment of this invention is now explained below in detail with reference to FIG. 2.

A hollow shaft 1 is operatively coupled through a transmission mechanism or gear shift system 5 to a drive shaft 3, which in turn is operatively coupled through a main clutch to a crankshaft of an internal combustion engine which is not shown in the figure. This hollow shaft 1 of this invention is divided into an output side section 1a and an input side section 1b which can be operatively connected with each other by a sleeve 7 therebetween. The sleeve 7 is spline-coupled to the output side section 1a and the input side section 1b of the hollow shaft 1 so as to longitudinally slide thereover. The configuration permits the sleeve 7 to slide in the axial direction of the input shaft 1 when the differential lock lever, which is not shown in the figure, is operated.

A pinion shaft 9 is fixed to the output side section 1a of the hollow shaft 1. The pinion gear 11 is rotatably supported by the pinion shaft 9. In a similar manner as in the example in FIG. 1, the pinion gear 11 is meshed to a pair of side gears 13a and 13b, and a front wheel drive shaft 15 extends through the hollow shaft 1. The side gear 13a, which is toward the rear of the vehicle (the right side in FIG. 2), is spline-coupled to a collar 17, which is screwed onto one end of the front wheel drive shaft 15. A spacer 21 is interposed between the collar 17 and the input side 1b of the output shaft 1 through a thrust bearing 19 such that the spacer 21 is inserted between the drive shaft 15 and the output side section 1a of the hollow shaft 1. The collar 17 is retained by a nut 23 which is screwed onto the front wheel drive shaft 15. It will be noted that the input side section 1b is rotatable relative to the spacer 21 and the front wheel drive shaft 15. On the other hand, a front wheel side differential device, which is not shown, is coupled to the other end of a front wheel drive shaft 15.

The side gear 13b, which is toward the front of the vehicle, is formed integrally with a differential case 25. The differential case 25 encloses the pinion shaft 9, pinion gear 11, and side gears 13a and 13b. Both the front and rear ends of the differential case 25 are rotatably supported by a transfer case (not shown) through bearings (also not shown). Consequently, the differential case 25, which is a heavy object and in addition is subjected to strong gear meshing reaction forces, can be strongly supported. The differential case 25 has a drive gear 27 which can be meshed with an input gear (not shown) of a rear wheel drive shaft (not shown). This permits power to be drawn from the differential case 25.

Meanwhile, the front end (the left end in FIG. 2) of the differential case 25 sticks out somewhat. A case side claw 29 is positioned between the differential case 25 and the sleeve 7, and acts as one part of the engagement section for differential locking. The sleeve 7 has a sleeve side claw 31, which acts as the other part of the engagement section which opposes the case side claw 29. Since the sleeve 7 is positioned forward of the differential case 25, the shift lever of the transmission gears, which are also located toward the front, and the differential lock lever (not shown) which operates the sleeve 7 can be easily located near each other.

In operation, the input which is received by the hollow shaft 1 from the internal combustion engine, which is the drive device, through the drive shaft 3 and the transmission mechanism 5 is transmitted through the input side section 1b of the hollow shaft 1, the sleeve 7, the output side section 1a, the pinion shaft 9, the pinion gear 11 and the side gears 13a and 13b. One of the side gears 13a rotates the front wheel drive shaft 15, while the other side gear 13b rotates the rear wheel drive shaft (not shown) through the differential case 25, the drive gear 27 and the input gear (not shown). These drive shafts in turn transmit power to the front and rear wheels, which are not shown.

When a difference in rotation rates arises between the front wheel drive shaft 15 and the rear wheel drive shaft not shown, this means that there is also a difference in rotation rates between the side gear 13a which drives the front wheel drive shaft 15 and the side gear 13b which drives the rear wheel drive shaft. This difference is absorbed by the rotation of the pinion gear 11. When a differential lock becomes necessary, the sleeve 7 is caused to slide by operation of the differential lock lever at the driver's seat, which is not shown, so that the sleeve side claw 31 engages the case side claw 29; then the hollow shaft 1 and the differential case 25 are locked together and move as one unit for differential locking.

In this structure, when assembling, a subassembly is formed comprising the differential case 25, which is connected to the output side section 1a of the hollow shaft 1, the pinion shaft 9, the pinion gear 11 and the side gears 13a and 13b. This subassembly is coupled to one end of the front wheel drive shaft 15. The output side section 1a of the hollow shaft 1 is spline-coupled to the sleeve 7, and the side gear 13a is spline-coupled to the collar 17.

In summary, the configuration of this invention permits the input received by the hollow shaft from the drive device to be drawn from the differential case through the pinion shaft, pinion gear and side gear, and transmitted directly to the rear wheel drive shaft. This means that it is not necessary to have an intermediate shaft to transmit motive power from the side gear to the rear wheel drive shaft, and the length of the transfer case along the front-rear direction of the vehicle can be made much shorter. Consequently, the transfer case can be made more compact, which greatly reduces the restrictions on freedom in designing other parts.

In addition, shortening the transfer case makes it easy to increase the clearance bellow the vehicle, so that the performance of the vehicle in off-the-road travel, which is one of the main purposes of a four wheel drive vehicle, can be improved. Eliminating the intermediate shaft and shortening the transfer case reduces the overall weight, and this is also an advantage in off-road travel. Eliminating the intermediate shaft also eliminates the need for the bearing that supports it, and the reduced number of parts simplifies assembly and parts supervision. At the same time, since the front wheel drive shaft passes through the hollow shaft along its axis and the rear wheel drive shaft is positioned above the front wheel drive shaft, the height above ground of the rear wheel drive shaft, which extends far to the rear of the vehicle, is easy to maintain enough; this is particularly advantageous in off-the-road driving.

Moreover, since the output side of the hollow shaft is divided through the sleeve, it is easy to design a configuration in which the output side of the hollow shaft can be incorporated into a subassembly. At the same time, an engagement section for differential locking is positioned between the sleeve and the differential case, which makes subassembly possible, so that the sleeve can be used for differential locking.

While the subject invention has been described with reference to a preferred embodiment, it is apparent that various modifications, alterations and changes may be made therein by one skilled in the art without departing form the scope and spirit of the invention as defined by the appended claims.

What is claimed is:

1. A power dividing differential comprising: a hollow shaft for receiving input from a drive device; said hollow shaft comprising input and output side sections separated from each other; a pinion shaft provided on the output side of the hollow shaft; a pinion gear rotatably supported by the pinion shaft; a pair of side gears meshed with the pinion gear; a front wheel drive shaft passing through the axis of the said hollow shaft and coupled integrally operatively to one of said side gears; a differential case integrally connected with the other of said side gears and containing said pinion shaft, pinion gear and side gears, and from which power can be taken; a sleeve provided to operatively connect said input side section of said hollow shaft with said output side section thereof; and an engagement section for differential locking provided between said sleeve and said differential case such that said sleeve and said differential case can be engaged and disengaged by motion of said sleeve.

2. A power dividing differential comprising: an input side hollow shaft section to receive input power from a drive shaft, and an output side hollow shaft section inserted in a differential case which houses a differential mechanism therein and is connected to a rear wheel drive shaft through a gear set, a sleeve for connecting said input side hollow shaft section to said output side hollow shaft section through splines, whereby said sleeve is adapted to rotate together with said input and output side hollow shaft sections, a front wheel drive shaft extending through said input side and output side hollow shaft sections and removably connected to said hollow shaft at the output end thereof, said sleeve being slidable in the longitudinal direction such that said sleeve can be disengaged from said differential case for differential operation when slided to the input side and engaged with said differential case for differential locking operation when slided to the output side.

3. The power dividing of claim 2, wherein a spacer is inserted between said output side hollow shaft section and said front wheel drive shaft and abutted to said input side hollow shaft section through a bearing means.

* * * * *